Aug. 26, 1947.                C. P. VAN FRANK                2,426,475
                        COOLING JACKET FOR MILK CANS
                            Filed Feb. 13, 1946

Inventor
Charles P. Van Frank
By  A. E. Fisher
            Atty.

Patented Aug. 26, 1947

2,426,475

UNITED STATES PATENT OFFICE 2,426,475

COOLING JACKET FOR MILK CANS

Charles P. Van Frank, Mooreland, Okla.

Application February 13, 1946, Serial No. 647,282

2 Claims. (Cl. 62—154)

This invention relates to cooling jackets for milk cans and the like, as conventionally employed for keeping cream and milk cool and in condition for the markets in the course of transportation and storage. Usually seven milkings of cream are gathered during several days' time before the average farmer takes his cream to market, and it is necessary to keep this cream cool from day to day while in storage during the process of collection, and while it is being transported to market.

The principal object of the invention therefore is to provide a semi-porous and absorbent jacket, preferably of some sort of fibrous and flexible material such as canvas, the said jacket being formed and adapted to loosely receive and cover any conventional form of milk or cream can such as commonly used for the purposes above stated, a circular base plate of wood or metal being provided and specially formed, flanged and featured to engage the lower ends of both the can and the jacket, with means for tightly clamping the can and jacket to said base for preventing water leakage thereat, the top end of the jacket being open for passing the neck of the can, and means being provided for drawing up the margins of the top end of the jacket to the neck of the can, whereby water may be filled into the space between the can and the jacket, and by virtue of its gradual seeping and sweating therethrough and its subsequent evaporation at the outer surface of the jacket, function and operate in a well known manner to cool and reduce the temperature of the can itself and the cream or milk contained therein, thereby preserving same against deterioration.

Another object of the invention is to provide an inexpensive, cylindrically shaped cover or jacket of some absorbent and semi-porous material, the ends thereof being open and the jacket itself being of a size as mounted over a conventional milk-can to provide an intervening water space between the can and jacket, means for securing the upper end of the jacket to the neck of the can, and a base plate formed and adapted for receiving the lower ends of the lower ends of the jacket and inclosed can, with means for releasably locking these elements together in water tight relation, whereby water as filled into the said intervening water space, will gradually seep out through the jacket and by evaporating from the outer surface thereof produce in a well known manner a cooling effect upon the can and contents thereof, thus preserving said contents against deterioration.

With the stated objects in view, together with such other and additional objects and advantages as may appear from the specification, attention is directed to the accompanying drawing as showing a preferred embodiment of the invention, as well as a modification thereof and wherein.

Figure 3:
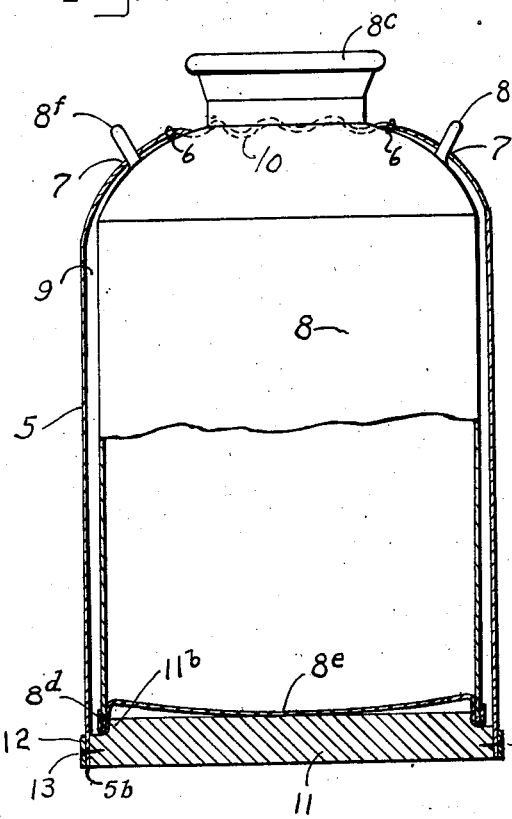
Figure 3 is a vertical and longitudinal section on the line 3—3 of Figure 2, the upper portion of the assembly however being shown in full lines, while the lower portion is shown in section.

This invention comprises a cylindrically shaped cover or jacket represented generally at 5 in the drawing, the same being made of a single rectangular piece or cutting of some sort of flexible and absorbent and semi-porous material such as closely woven canvas or the like, the margins of the rectangular piece being brought together and stitched, to form the connecting seam 5a, thus leaving the upper and lower ends of the jacket open. The upper end of the jacket is formed with a series of draw cord engaging grommets 6, and with oppositely positioned handle slots 7, while the lower end is finished with the smooth, flat seam 5b, as shown in Figure 3.

Figure 1:
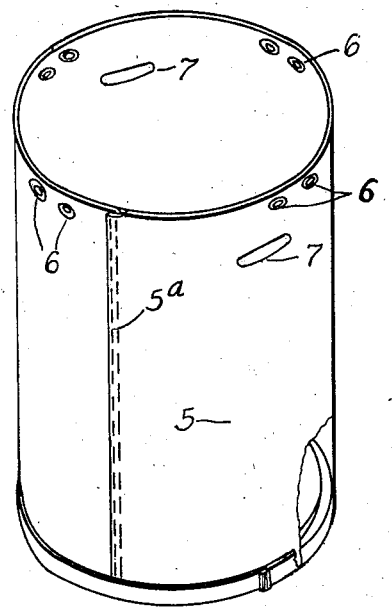
Figure 1 is a perspective view of the cover or jacket alone, as removed from the milk or cream can which it is designed for inclosing.
Figure 2:
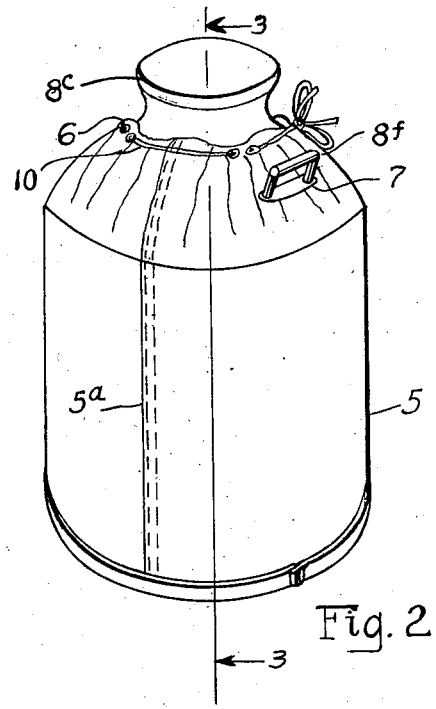
Figure 2 is a similar perspective view of the jacket as mounted upon and inclosing a milk or cream can of conventional form.
Figure 4:
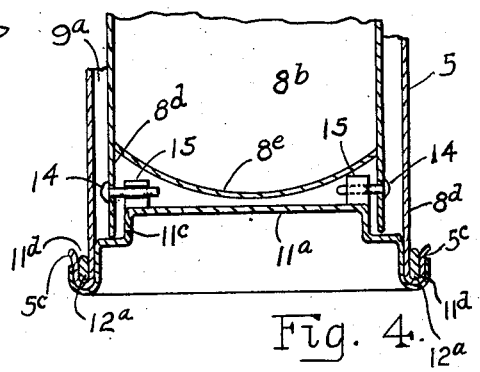
Figure 4 is a sectional detail of the lower end of a conventional milk or cream can, as seated within a modified form of base plate constructed and formed of sheet metal.

The jacket or cover as described is designed for mounting upon and over any conventional form of milk or cream can or container, such as here represented generally at 8 (Fig. 3) or 8b (Fig. 4), these said cans being formed with reduced neck portions 8c, and pendant skirt portions 8d extended below the bottom portions 8e. The jacket is sized or dimensioned so as not only to inclose the can, but to provide therein between an intervening water space as indicated at 9 (Fig. 3) or 9a (Fig. 4). The handles 8f of the can pass up through the handle slots 7 of the jacket, and by means of a draw-cord 10, passed around through the grommets 6 of the jacket, the upper margins of the flexible jacket may be drawn up closely to and around the neck 8c of the can, as shown in Figures 2 and 3.

The particular novel feature of this invention resides in the base plates 11 and 11a (Figs. 3 and 4 respectively), the base plate 11 being made of waterproofed wood, while the base plate 11a is made of stamped sheet metal. In either case these base plates are circular to conform with the bottom of the milk can to be seated thereon, and are of approximate equal diameter with such can, except that the lower portions of the plates are widened out somewhat to meet the pendant lower end margins of the jacket 5. As shown in Figure 3 the circular base plate 11 is notched out angularly around its periphery, as shown at 11b, and in Figure 4 as shown at 11c, for receiving the lower annular extremity of the pendant skirts or skirt portions 8d of the cans 8, 8b. As shown in Figure 3 the pendant lower and annular margin of the jacket falls alongside and outwardly of the annular lower portion of the base plate 11, and is anchored closely thereto in a waterproofed manner by means of a metal ring 12 which overlies the lower margin of the jacket and is there held and retained either frictionally or by means of screws 13. As shown in Figure 4 the lower annular margins of the sheet metal base 11a are turned out and upwardly to provide a trough 11d, into which trough the lower annular edge or margin of the jacket 5 is inserted and turned up outwardly, conformably with the curve of the trough, as shown at 5c, and a heavy iron ring 12a is wedged down into the trough 11d and into the bight of the upturned annular margin of the jacket 5, thus providing a water tight joint and closure thereat, and supporting the jacket in spaced relation to the can 8b and forming the said water space 9a. The elements are rigidly supported in the position and relation as shown in the assembly of Figure 4, by means of bolts 14 passed through the pendant skirt 8d of the can 8b into or through metal lugs 15 anchored at opposite margins of the upper side of the top side of the base plate 11a.

In use the milk can or container is seated as described within the jacket or cover, and water is filled into the water space provided between the can and jacket. The milk or cream is then poured into the can as occasion requires. The water seeps gradually out through the semi-porous jacket and by evaporating at the outer surface thereof operates in usual manner to cool the can and contents.

While I have here shown and described certain embodiments of the invention, the structural features thereof as shown may be changed or modified in minor details as desired, within the scope of the claims.

I claim:

1. A cylindrical, semi-porous jacket for inclosing a cylindrical milk or cream can, the said jacket being open at its ends and there being means for attaching the upper end of the jacket to the upper end of the can, the jacket being sized to provide an intervening water space between the can and jacket, a base plate for receiving the lower ends of the can and jacket and supporting these elements in spaced relation for maintaining the said water space therein between, means for closely connecting the lower end of the jacket to the said base plate to prevent water leakage thereat, the base plate being circular in form and adapted to pass flatly into the lower end of the jacket below the can as seated within the jacket, and an iron ring adapted to frictionally fit over the lower end of the jacket and inclosed base plate, for closely securing the lower end of the jacket to the base plate.

2. A cylindrical, semi-porous jacket for inclosing a cylindrical milk or cream can, the said jacket being open at its ends and there being means for attaching the upper end of the jacket to the upper end of the can, the jacket being sized to provide an intervening water space between the can and jacket, a base plate for receiving the lower ends of the can and jacket and supporting these elements in spaced relation for maintaining the said water space therein between, means for closely connecting the lower end of the jacket to the said base plate to prevent water leakage thereat, the said milk or cream can having an annular pendant skirt extended below the bottom of the can, the base plate being circular in form and angularly recessed peripherally at its upper side for receiving the lower margin of the pendant skirt, the plate as a whole being sized and adapted to pass flatly into the lower end of the jacket below the can as seated therein, and means for securing the lower end of the jacket to the lower, outer margin of the base plate.

CHARLES P. VAN FRANK.

REFERENCES CITED

The following references are of record in the file of this patent:

UNITED STATES PATENTS

| Number | Name | Date |
| --- | --- | --- |
| 1,425,241 | Dent | Aug. 8, 1922 |
| 1,668,598 | Osborn | May 8, 1928 |
| 1,857,018 | Hanson | May 3, 1932 |